(12) United States Patent
Stanford

(10) Patent No.: US 7,163,419 B2
(45) Date of Patent: Jan. 16, 2007

(54) HIGH CURRENT WATER CONNECTION COUPLING BLOCK

(75) Inventor: Guy H. Stanford, Vancouver (CA)

(73) Assignee: Triumf, Vancouver (CA)

( * ) Notice: Subject to any disclaimer, the term of this patent is extended or adjusted under 35 U.S.C. 154(b) by 27 days.

(21) Appl. No.: 11/128,234

(22) Filed: May 13, 2005

(65) Prior Publication Data

US 2006/0057888 A1 Mar. 16, 2006

Related U.S. Application Data

(60) Provisional application No. 60/570,454, filed on May 13, 2004.

(51) Int. Cl.
*H01R 33/945* (2006.01)
(52) U.S. Cl. ..................................... 439/577
(58) Field of Classification Search ............... 439/577, 439/746, 374, 283, 195; 285/119, 131, 137.5, 285/334.4, 120.1, 152.1
See application file for complete search history.

(56) References Cited

U.S. PATENT DOCUMENTS 3,589,673 A * 6/1971 Cruse ..................... 251/149.1
3,624,585 A * 11/1971 Kokalas et al. .............. 439/195
3,835,240 A 9/1974 Matthäus
5,683,118 A * 11/1997 Slocum ...................... 285/119
2002/0019177 A1* 2/2002 Bartholomew .............. 439/746

FOREIGN PATENT DOCUMENTS

DE 20119352 U1 3/2002
DE 10253796 A1 6/2004

OTHER PUBLICATIONS

ISR dated Aug. 22, 2005.

* cited by examiner

*Primary Examiner*—J. F. Duverne
(74) *Attorney, Agent, or Firm*—Harness, Dickey & Pierce

(57) ABSTRACT

Provided is an example of an improved coupler element that provides both a fluidic connection for transporting cooling fluid into and/or out of, the target and a high capacity electrical conductor suitable for the transmitting electrical current to the target during operation of the accelerator. The improved coupler element includes fasteners, alignment structures and sealing structures that can be arranged on opposing faces of a two-part coupler such as a water connection block assembly used on an accelerator.

18 Claims, 5 Drawing Sheets

HIGH CURRENT WATER CONNECTION COUPLING BLOCK

PRIORITY STATEMENT

This application claims priority from U.S. Provisional Patent Application No. 60/570,454, filed May 13, 2004, the contents of which are hereby incorporated herein by reference in their entirety.

BACKGROUND OF THE INVENTION

The present invention relates generally to the production of radioactive ion beams (RIB) and radioisotopes, and, more specifically, to a connector assembly suitable for use in facilities that have both, high current demands and high cooling demands. In RIB facilities, such as TRIUMF's Isotope Separator and ACcelerator (ISAC) facility, a proton beam can be applied to the target, thereby producing a variety of unstable radioactive nuclei that can be separated and directed to various experimental areas and may be subjected to secondary acceleration.

Radioisotopes may be produced by irradiating a target material with a particle beam produced in an accelerator with the target material and beam particles determining the radioisotope products resulting from a range of nuclear reactions. The desired sample material, which may be provided in gas, liquid or solid form, is placed in a suitably configured target and then irradiated with a specified charged species at a particular beam current and beam energy sufficient to modify the sample material and produce the desired radioisotope product species. The radioisotope product(s) may then be recovered from the altered sample material and/or the target surfaces for use in other applications.

Other research utilizes nuclear reactions for producing radioactive nuclear beams rather than lighter radioisotopes. Radioactive ion beams can be produced with a wide variety of techniques with a common factor being that the isotope(s) of interest is the result of a nuclear reaction, e.g., a reaction between an accelerated primary projectile beam and a stationary target. The list of reactions that are used for RIB experiments includes, for example, fission, fusion-evaporation, spallation, and fragmentation.

Which reaction is chosen depends to a large degree on which radioactive nucleus one wants to produce. As a rule, it is easier to produce "proton rich" nuclei, i.e., those nuclei with a low neutron-to-proton ratio (isospin). Because the initial reaction products often are highly excited immediately after the nuclear reaction, they will deexcite by evaporating particles. Because the average binding energy for neutrons is lower than for protons, neutrons are preferentially evaporated from the reaction products, leaving residues with lower isospin than the projectile/target combination. Accordingly, it can be difficult to produce neutron-rich residues from nuclear reactions, although fission and some fragmentation reactions can be used. In any event, the probability that the bombardment will produce a certain nuclide (the so-called production cross section) tends to decrease with the distance of the desired reaction product from the stability line regardless of the production method utilized.

In most cases, the production reaction is non-selective and produces a variety of reaction products that must be subsequently separated to isolate the desired isotope and provide the necessary degree of isotope purity. The choice of separation method will be limited by the reaction used. If the reaction residues have relatively high kinetic energy, such as those seen in reaction residues from fragmentation processes, they can be separated according to their charge-to-mass ratio by deflection in magnetic and/or electric fields (assuming that at least some electrons were removed to leave the residues in an ionized state.) In other reactions, the reaction residues might have relatively low recoil velocities, in which case isotope separation on-line (ISOL) techniques may be utilized in which the residues are collected (e.g., in a catcher foil or a gas), transported via diffusion or gas-jet techniques into an ion source where they are (singly) ionized, and then extracted by a relatively low acceleration potential. The resulting ion beam can then be electromagnetically mass separated.

One of the more frequent operations associated with the production of radioisotopes is removing or otherwise accessing the target assembly that will be or has been irradiated by the charged particle beam. Particularly during the production of RIB, the target assembly may be fabricated from a refractory metal, thereby allowing the target to be heated to relatively high temperatures. Establishing and maintaining this temperature can demand relatively high power levels, e.g., 1000 A or more, and the target temperature can present problems for adjacent, non-refractory components, such as the electrical connections to the target. The operation of the facility also typically includes detaching (and subsequently reattaching) various power and coolant supply lines required for proper operation of the various parts of the apparatus.

In particular, sufficient cooling capability is required for operating the accelerators at higher beam currents and energies for controlling the temperature of the target and/or adjacent components in order to increase the production of the desired radioisotopes, control pressure increases within the system, avoid heat damage to components and/or maintain the sample material in a desired state. Accordingly, a need exists for simplifying and/or otherwise improving the ability to make the necessary electrical and fluidic connections in such equipment.

BRIEF SUMMARY OF THE INVENTION

Provided is an example of an improved coupler element that provides both a fluidic connection for transporting cooling fluid into the vicinity of the target, e.g., into the electrical connection blocks connected to the target, and a high capacity electrical conductor suitable for the transmitting sufficient electrical current to the target during operation of the accelerator for maintaining the desired target temperature. The improved coupler element includes fasteners, alignment structures and sealing structures, arranged on opposing faces of a two-part coupler such as a water connection block assembly.

BRIEF DESCRIPTION OF THE DRAWINGS

The above and other features and advantages of the present invention will become more apparent by describing in detail exemplary embodiments thereof with reference to the attached drawings in which.

Figure 1:
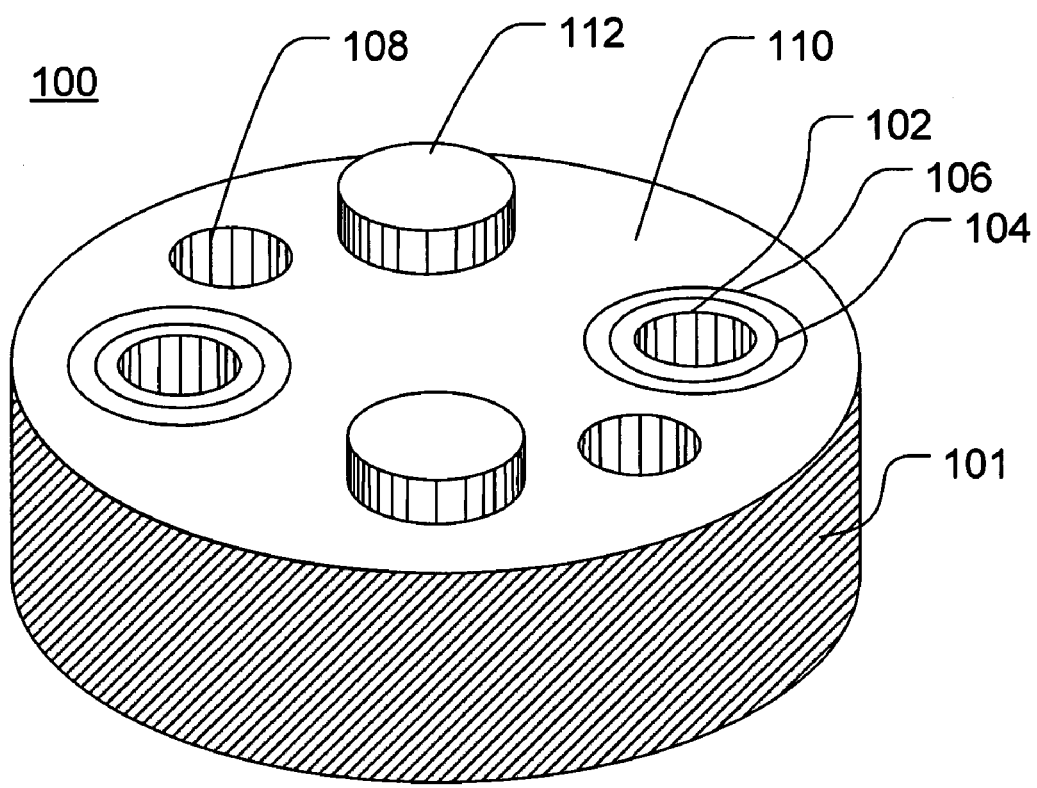
FIG. 1 illustrates a first portion of an exemplary coupler.

These drawings have been provided to assist in the understanding of the exemplary embodiments of the invention as described in more detail below and should not be construed as unduly limiting the invention. In particular, the relative spacing, sizing and dimensions of the various elements illustrated in the drawings are not drawn to scale and may have been exaggerated, reduced or otherwise modified for the purpose of improved clarity. Those of ordinary skill in the art will also appreciate that certain structures that may be commonly utilized in the construction of such couplers, such as tool alignment structures or fixtures, have been omitted simply to improve the clarity and reduce the number of drawings.

DETAILED DESCRIPTION OF EXEMPLARY EMBODIMENT

As illustrated in FIG. 1, a coupling member according to the present invention will include a first part 100 manufactured primarily from a first material 101, such as copper or a copper alloy, that is a good conductor of both electrical current and heat. The first part will include a fluid passage 102 through which one or more fluids may flow through the coupler and into attached fluid lines (not shown), seal retainer 104, and a compressible seal 106. The first part will also include an alignment structure 112, a fastener passage 108, and a generally planar main contact surface 110.

Figure 2:
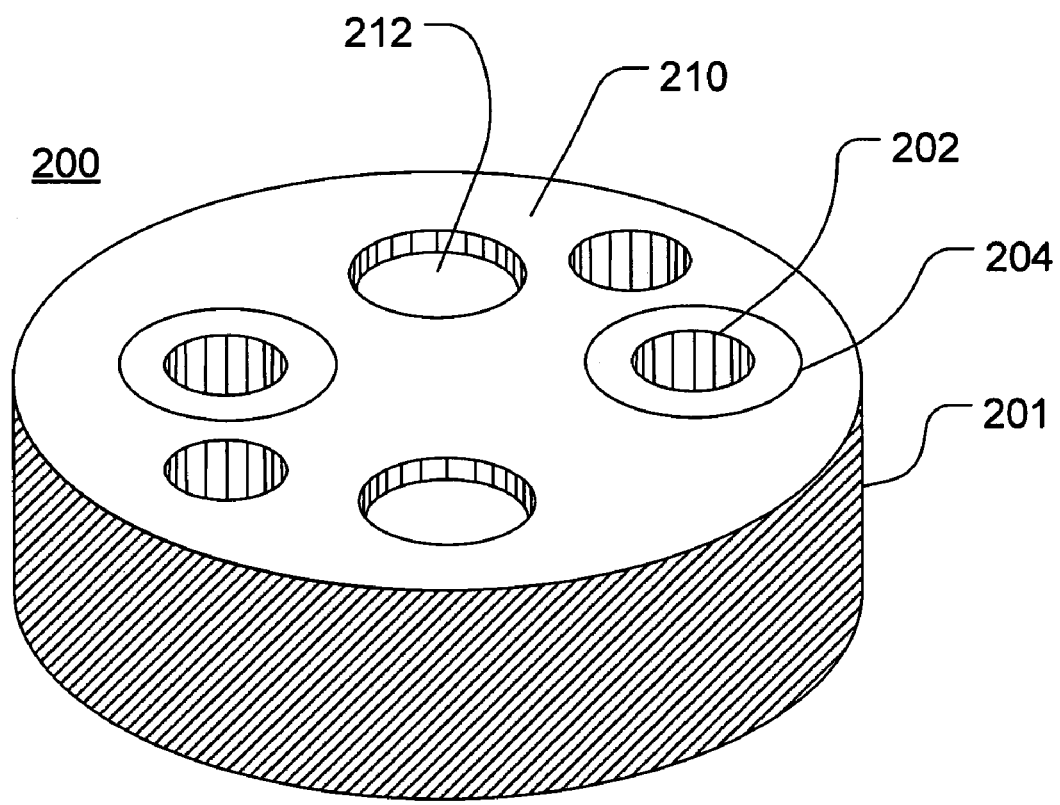
FIG. 2 illustrates a second portion of an exemplary coupler.

As illustrated in FIGS. 1 and 2, the first part 100 will be attached to a complementary second part 200 to form the coupler. As with the first part, the second part 200 will be manufactured primarily from a first material 201, such as copper or a copper alloy, that is a good conductor of both electrical current and heat. The second part will include a fluid passage 202 through which one or more fluids may flow through the coupler and into attached fluid lines (not shown), and a seal surface 204. The second part 200 will also include a corresponding alignment structure 212, a fastener passage 208, and a generally planar main contact surface 210.

Figure 3A:
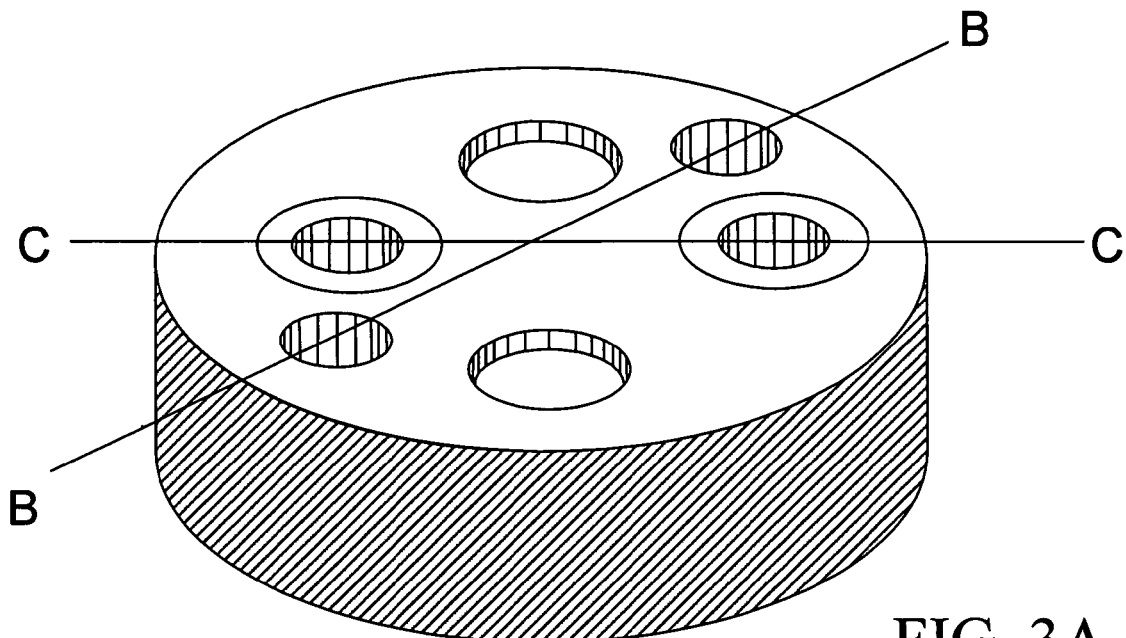
FIGS. 3A–C illustrate the second portion of an exemplary coupler in more detail.
Figure 3B:
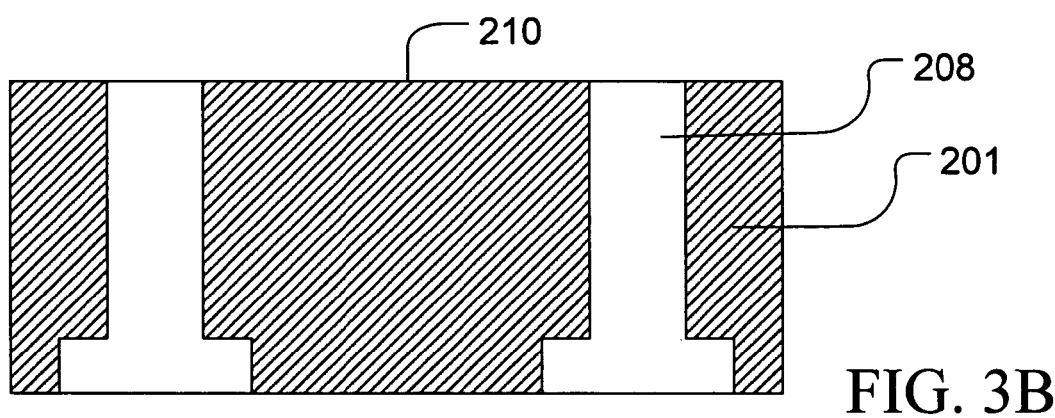
Figure 3C:
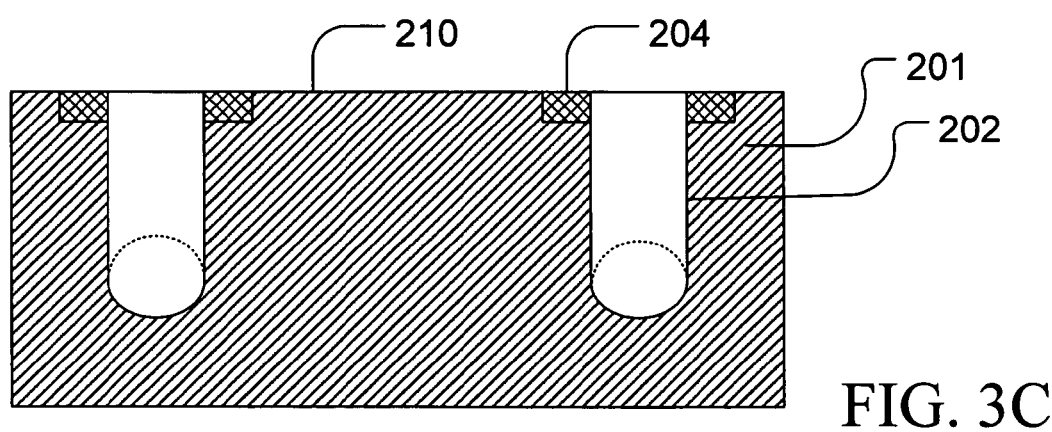

As illustrated in FIG. 3B, a cross-sectional view along line B—B in FIG. 3A, the fastener passage 208 may include a recess for a bolt and a flange for forcing the contact surface 210 against the opposing contact surface 110 when the coupler is assembled. As illustrated in FIG. 3C, a cross-sectional view along line C—C in FIG. 3A, the seal surface 204 may be formed from a secondary material, typically one that is both less ductile and less conductive than the primary material 201, for example stainless steel, that is provided in a recess on the main contact surface 210.

Figure 4A:
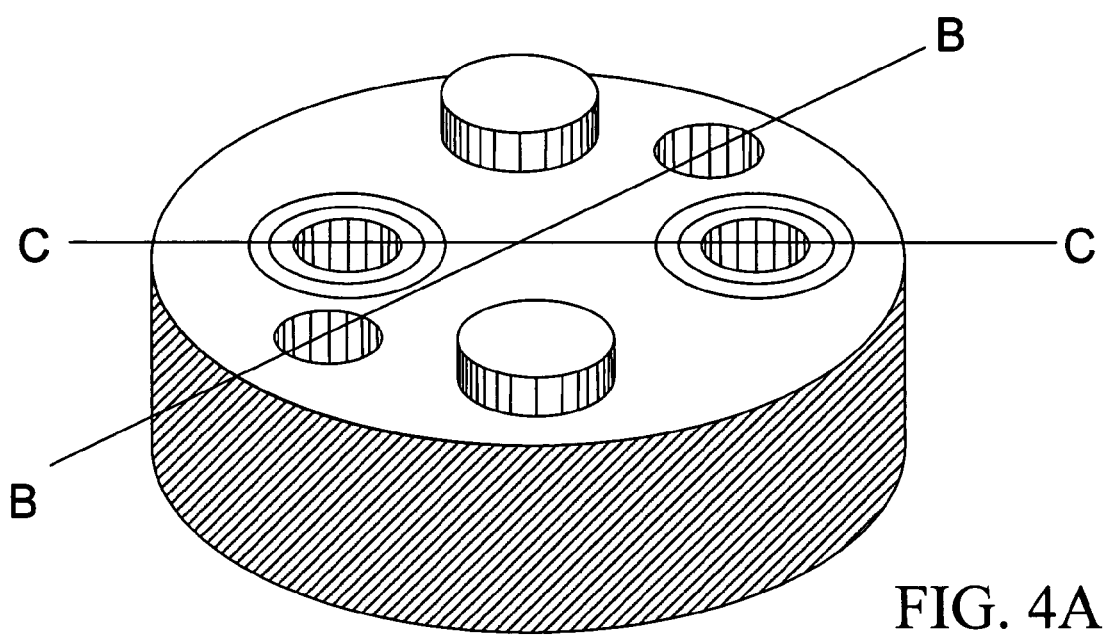
FIGS. 4A–C illustrate the first portion of an exemplary coupler in more detail.
Figure 4B:
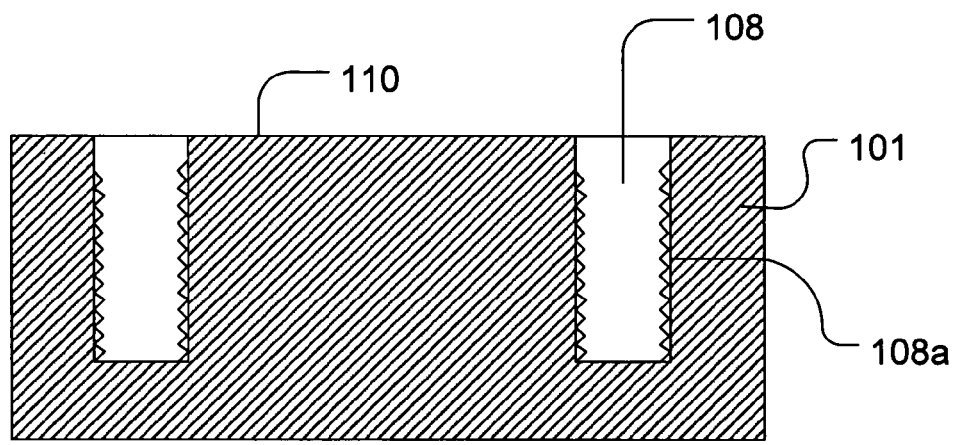
Figure 4C:
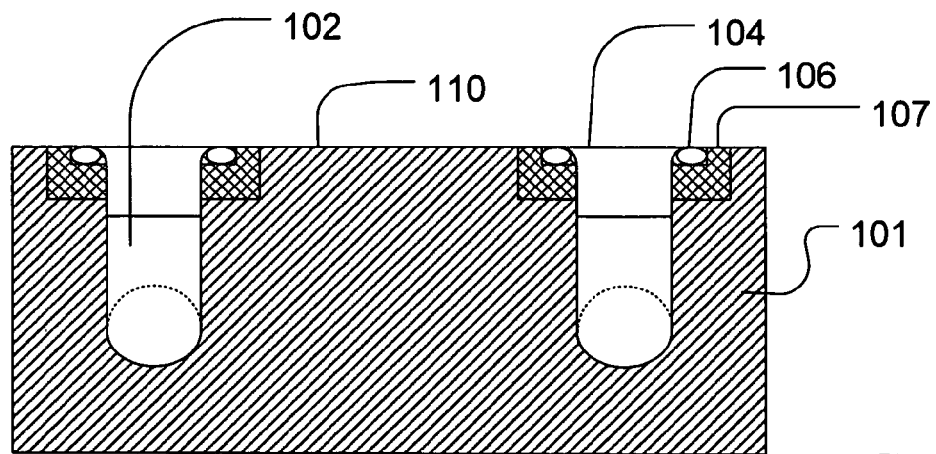

As illustrated in FIG. 4B, a cross-sectional view along line B—B in FIG. 4A, the fastener passage 108 may include threads 108a for receiving a bolt for forcing the contact surface 110 into form contact against the opposing contact surface 210 when the coupler is assembled. As illustrated in FIG. 4C, a cross-sectional view along line C—C in FIG. 4A, the seal retainer may be configured to hold the seal 106 in place adjacent the fluid passage 102 and may, itself, be seated on, supported by or contained within a portion of secondary material 107 provided in a recess on the main contact surface 110.

The secondary material 107 will typically be one or more materials that are, whether individually or in combination, both less ductile, harder, and less conductive than the primary material 101 while still being compatible for use with the primary material. When copper or a copper alloy is used to form the contact surfaces and/or the bulk of the first part 100, materials including, for example, stainless steels may be suitable as secondary material(s) 107. The secondary material(s) 107 can be provided in a recess on the main contact surface 110 and may have relative complex profiles for both seating in the first part 100.

As will be appreciated by those skilled in the art, the seal configuration and material may be provided in a range of compositions and configurations depending on the particular operating conditions under which the coupling is expected to operate. In some instances, it is anticipated that resilient metallic C-seals, particularly those formed from stainless steel, will be among the sealing devices that would be considered generally suitable for demanding applications, particularly those such as high temperature or high radiation environments in which conventional elastomeric gaskets or seals would not survive or would present a source of particulate and/or chemical contamination.

Figure 5A:
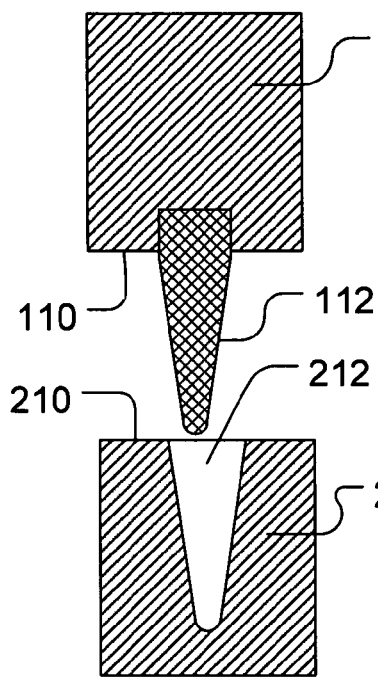
FIGS. 5A–C illustrate the connection of the first and second portions of an exemplary coupler.
Figure 5B:
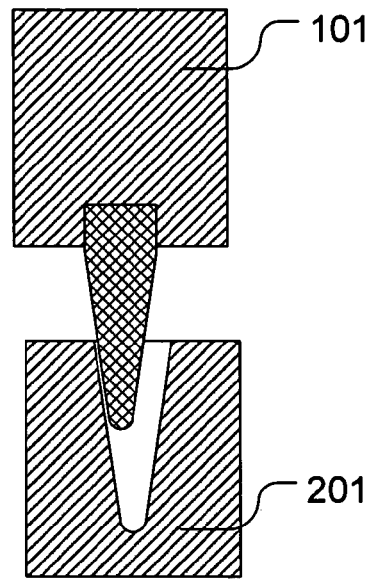
Figure 5C:
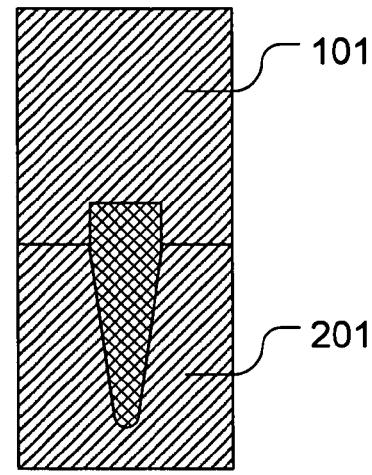

As illustrated in FIGS. 5A–C, providing complementary alignment structures 112 and 212, particularly structures having a tapered profile, will assist in the alignment and attachment of the first 100 and second 200 portions of the coupler. As illustrated in FIGS. 5A–C, the narrower front portion of the male structure 112 allows for some initial misalignment of the first and second portions and, as the separation between the opposing contact surfaces is reduced, will tend to guide, FIG. 5B, the respective portions into proper alignment, FIG. 5C.

Figure 6:
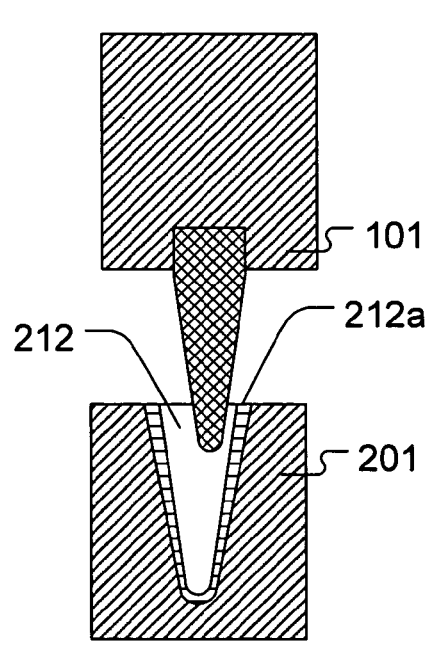
FIG. 6 illustrates an alternative construction of an alignment structure.

As illustrated in FIG. 6, the contact surfaces of one or both (not shown) of the alignment structures 112, 212 may be constructed from or provided with a surface layer or treatment, for example ion implant or some form of passivation, that would tend to reduce the wear of such surfaces during the alignment process.

Figure 7A:
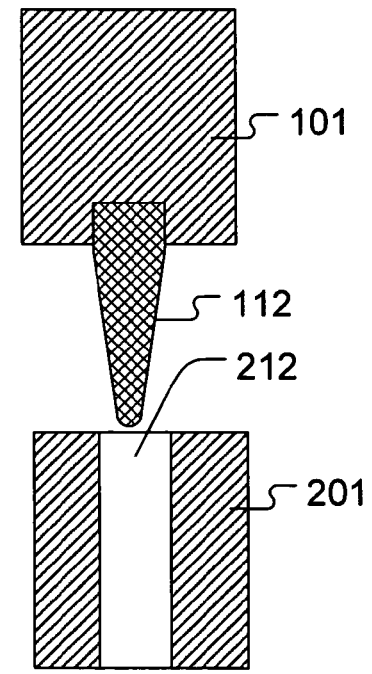
FIGS. 7A–B illustrate another alternative alignment structure.
Figure 7B:
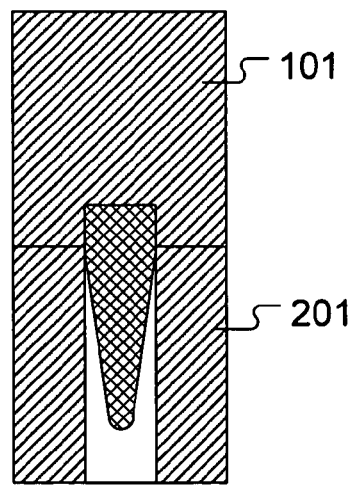

As illustrated in FIGS. 7A–B, the receiving alignment structure 212 may be partially or completely open, in order to reduce the likelihood that particulate or even fluid debris or contaminants will become trapped within the first or second portions of the coupling. Such debris or contaminants would tend to reduce the contact between the first and second portions of the coupling and/or to create "dead" spaces that would tend to accumulate particulates and/or complicate cleaning of the second portion.

Figure 8:
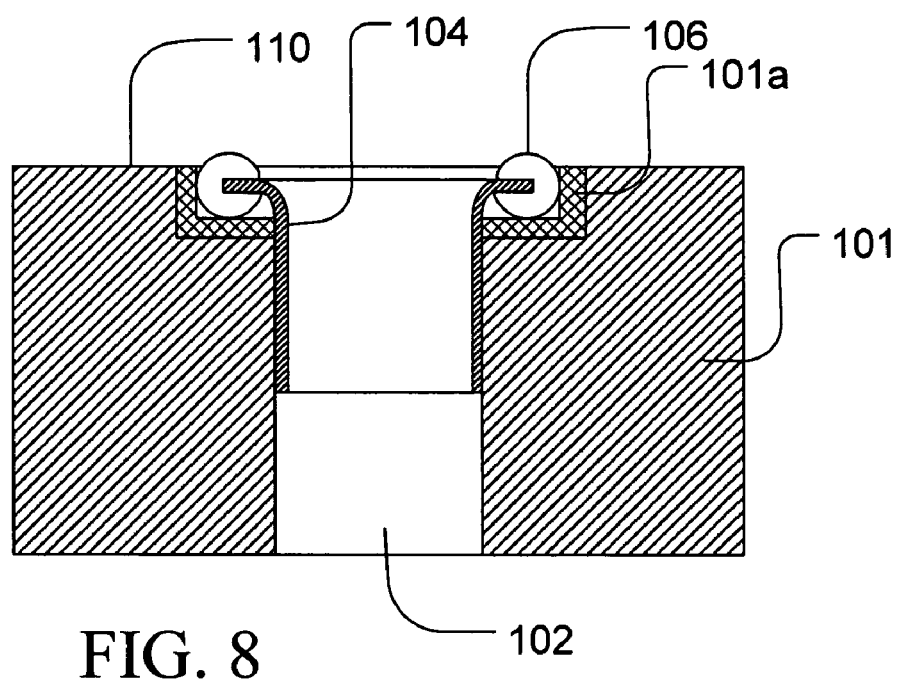
FIG. 8 provides additional detail regarding an exemplary fluidic coupling portion of an exemplary coupler.

As illustrated in FIG. 8, the seal 106 may be provided in a recess of a secondary material 101a provided at the contact surface 110 of the first portion. In its uncompressed configuration, an upper surface of the seal will tend to extend above a plane defined by the contact surface 110. As the first and second portions of the coupler are brought together and secured, the upper surface of the seal 106 will contact the seal surface 204 of the corresponding second portion 200 and be compressed to form a fluidic seal between the two portions of the coupler and allow fluid to flow through the coupler and the pipes and/or lines connected to the opposite ends, e.g., inlet and outlet openings, of the fluid passages formed through the coupler body.

Figure 9:
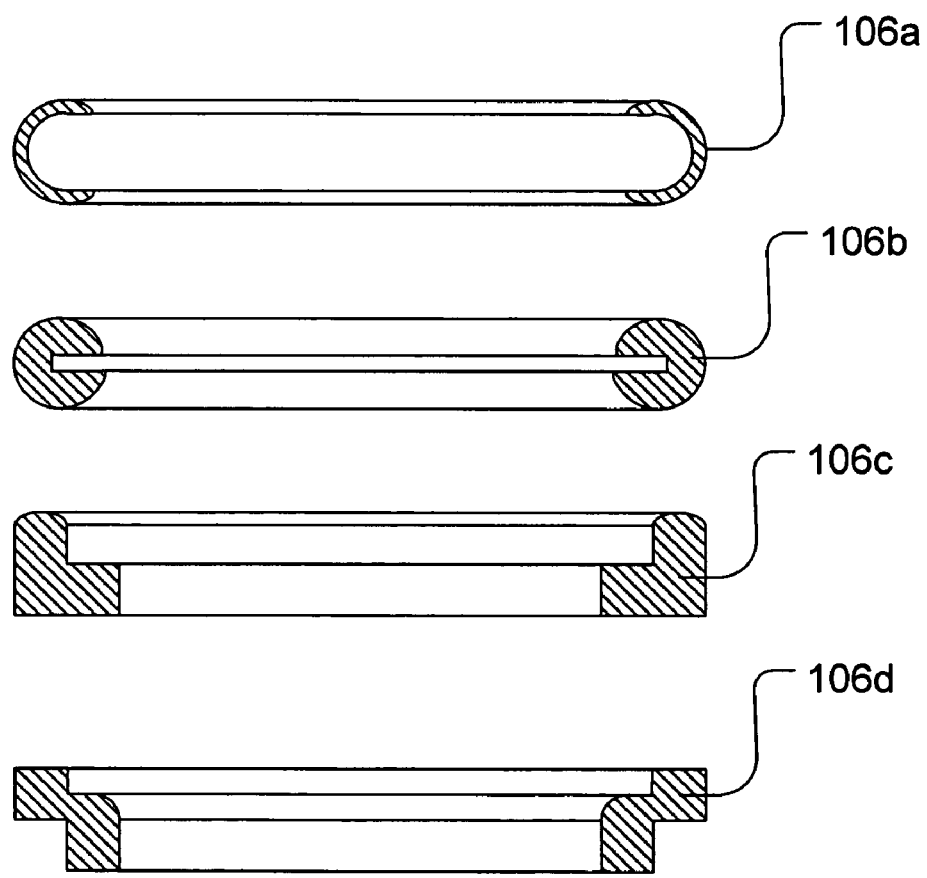
FIG. 9 illustrates some alternative configurations for the seal member utilized to form a fluidic seal.

A seal retainer 104 may be configured to interact with both the seal 106 and the fluid passage 102 sidewalls or other portion of the main body material 101 in order to maintain the position of the seal during the assembly and disassembly of the coupler. The seal retainer, like the seal surface 204, will tend to be formed from a material that is both less ductile and less conductive than the primary coupler material 101, 201. As illustrated in FIG. 9, the seals may be provided in a range of configurations and materials depending on the particular operating conditions anticipated for the coupler, including, for example, a C-seal having a profile similar to 106a of stainless steel.

The main contact surfaces of the first 100 and second 200 portions of the coupler, surfaces 110 and 210 respectively, will typically provide surface contact area of more than 50%, and preferably at least 70%, to establish good electrical contact and current conduction through the assembled coupler. In order to obtain this level of contact between the two portions, the contact surfaces may be flat-lapped and polished using an appropriate lapping paste or other successively finer abrasives produce a smoother and flatter surface, thereby improving the degree of direct physical contact between the mating surfaces and reducing the resistance to electrical current flowing between the first part and the second part of the coupler.

As electrical current through the coupler may be on the order of 1000 A or more, with the use of the less conductive materials, e.g., stainless steel inserts, in conjunction with the seal and sealing surfaces tending to provide a degree of protection from the current flow. Although not shown, additional alignment and/or attachment structures or fixtures may be provided on the exterior of the first and/or second coupler portions for use with remote and/or robotic assembly devices and techniques to avoid exposure to radioactive components.

While the present invention has been particularly shown and described with reference to exemplary embodiments thereof, the invention should not be construed as being limited to the particular embodiments set forth herein; rather, these embodiments are provided to convey more fully the concept of the invention to those skilled in the art. Thus, it will be apparent to those of ordinary skill in the art that various changes in form and details may be made therein without departing from the spirit and scope of the present invention as defined by the following claims.

What is claimed:

1. A coupling assembly comprising:
   a first coupling portion, the first coupling portion being manufactured from a first conductive material and including a first fluid channel extending between an exterior surface and a first contact surface and a first alignment structure; and
   a second coupling portion, the second coupling portion being manufactured from a second conductive material and including a second fluid channel extending between an exterior surface and a second contact surface and a second alignment structure;
   wherein the first contact surface and the second contact surface are brought into contact to form the coupling assembly, the degree of contact between the contact surfaces being at least 50%; and further wherein
   the first and second alignment structures have complementary structures that cooperate to align the first and second coupling portions whereby the first fluid channel and the second fluid channel combine to form a coupling fluid channel.

2. The coupling assembly according to claim 1, wherein: the degree of contact between the first and second contact surfaces is at least 70%.

3. The coupling assembly according to claim 1, further comprising:
   a fastener structure, the fastener structure being configured for maintaining contact between the first and second contact surfaces.

4. The coupling assembly according to claim 3, wherein:
   the fastener structures include a through hole in the first coupling portion and a corresponding recess in the second coupling portion, whereby a fastener can be inserted through the first coupling portion and engage the second coupling portion for maintaining contact between the first and second contact faces.

5. The coupling assembly according to claim 3, wherein:
   the fastener structure is configured to receive and cooperate with a fastener selected from a group consisting of threaded fasteners, camming fasteners and mechanically biased fasteners.

6. The coupling assembly according to claim 1, wherein:
   the first alignment structure includes a plurality of projecting structures extending from the first contact surface; and
   the second alignment structure includes a corresponding plurality of recesses provided in the second contact surface for receiving the projecting structures.

7. The coupling assembly according to claim 6, wherein:
   the plurality of projecting structures includes a first projecting structure having a first configuration and a second projecting structure having a second configuration; and
   the plurality of recesses includes a first recess having a first configuration corresponding to the first projecting structure and a second recess having a second configuration corresponding to the second projecting structure, wherein the first and second configurations are sufficiently dissimilar as to prevent rotational misalignment.

8. The coupling assembly according to claim 1, further comprising:
   a first seating region provided adjacent a first fluid channel opening on the first contact surface; and
   a second seating region provided adjacent a second fluid channel opening on the second contact surface, wherein the first and second seating portions cooperate to form a fluidic seal between the first and second contact surfaces of the coupling assembly.

9. The coupling assembly according to claim 4, further comprising:
   a resilient seal member provided adjacent at least one of the first and second seating regions, the resilient seal member being deformed as the first and second contact surfaces are brought together.

10. The coupling assembly according to claim 5, wherein: the resilient seal member is a metallic C-seal.

11. The coupling assembly according to claim 5, further comprising:
   a seal retainer, the seal retainer being configured for engaging the resilient seal member and extending into a fluid channel adjacent the resilient seal, thereby tending to maintain the relative positioning of the resilient seal member and the first or second fluid channel as the first and second contact surfaces are brought into contact.

12. The coupling assembly according to claim 1, further comprising:
   first external fluid fittings configured for connecting a first fluid conducting line to an external opening of the first fluid passage; and
   second external fluid fittings configured for connecting a second fluid conducting line to an external opening of the second fluid passage.

13. The coupling assembly according to claim 1, further comprising:
   a first electrical conductor for receiving electrical current from an external electrical supply and delivering the electrical current to the coupling assembly for transmission through the first and second coupling portions.

14. The coupling assembly according to claim 13, further comprising:
   a second electrical conductor for conducting electrical current from the coupling assembly to a structure external to the coupling assembly.

15. The coupling assembly according to claim 14, wherein:
   the coupling assembly can conduct electrical current having a magnitude of at least 500 A.

16. The coupling assembly according to claim 14, wherein:
   the coupling assembly is configured to conduct electrical current having a magnitude of at least 1000 A from the first conductor, through the coupling assembly, and into the second conductor.

17. A method of supplying utilities to a target using the coupling assembly of claim 1 comprising:
   aligning the first coupling portion and the second coupling portion in a configuration whereby the first and second contact surfaces are brought into contact;
   engaging a fastener to secure the first coupling portion to the second coupling portion to form a coupling assembly;
   attaching a fluid supply line to an exterior opening of the first fluid channel;
   attaching an electrical supply line to the coupling assembly.

18. A method of supplying utilities to a target according to claim 17, further comprising:
   attaching the coupling assembly to the target.

* * * * *